United States Patent [19]
Matthews

[11] Patent Number: 5,259,428
[45] Date of Patent: Nov. 9, 1993

[54] ROTARY CUTTERS

[76] Inventor: Leslie N. Matthews, 8 Cygnet Crescent, Dalkeith, Australia, 6009

[21] Appl. No.: 848,976

[22] PCT Filed: Aug. 17, 1990

[86] PCT No.: PCT/AU90/00357
   § 371 Date: Mar. 26, 1992
   § 102(e) Date: Mar. 26, 1992

[87] PCT Pub. No.: WO91/02616
   PCT Pub. Date: Mar. 7, 1991

[30] Foreign Application Priority Data
   Aug. 18, 1989 [AU] Australia ............... PJ5816

[51] Int. Cl.5 .................................. B27G 13/00
[52] U.S. Cl. ......................... 144/231; 83/836; 83/838; 144/218; 144/236; 407/31
[58] Field of Search ............ 407/30, 31, 51; 83/836, 83/837, 839; 144/218, 231, 236

[56] References Cited
U.S. PATENT DOCUMENTS

| | | | |
|---|---|---|---|
| 2,477,153 | 7/1949 | Succop | 407/51 |
| 2,659,398 | 11/1953 | Marvin | 144/236 |
| 5,090,287 | 2/1992 | Chezem | 144/231 |

Primary Examiner—W. Donald Bray
Attorney, Agent, or Firm—Nixon & Vanderhye

[57] ABSTRACT

This invention relates to a rotary cutter comprising a central member (11) adapted to be mounted to a shaft for rotation therewith and supporting a plurality of teeth (14a, 14b) located at intervals around a circular path, each tooth having at least one cutting edge (15, 16), a second member (12, 13) adapted to be mounted in association with the first member for rotation therewith and being capable of selective angular displacement in relation to the first member, said second member supporting a set of guides (18, 19) located at intervals around a circular path such that each guide is associated with one tooth of the plurality of teeth and is located ahead of said tooth.

15 Claims, 3 Drawing Sheets

ROTARY CUTTERS

THIS INVENTION relates to cutting tools and in particular rotary cutters for the purpose of cutting and carving material.

Rotary cutters which are used in the woodworking industry to cut, shape and carve, and for cutting of aluminium in the boat building and fabrication industry and the like cutters all generally comprise a plurality of spaced teeth which are supported from a central hub. Such teeth are provided with a radial cutting edge which cuts material in a direction substantially transverse to the plane of rotation (hereinafter referred to as a transverse cut) or a transverse cutting edge which cuts material in a direction which is substantially radial to the central axis of rotation (hereinafter referred to as a radial cut) or can effect both a transverse and a radial cut. Throughout the present specification, the term "transverse" refers to a direction which is substantially transverse to the plane of rotation of the central hub of the rotary cutter, and the term "radial" refers to a direction which extends substantially radial to the axis of rotation of the central hub. It is also known with such cutters to provide fixed depth chip limiting guides (hereinafter referred to as guides) ahead of, and close to each of the teeth to limit the depth of cut which is effected by each tooth. Such guides have a fixed predetermined height whereby the maximum radial depth of cut is believed to be determined by the difference in the radius of the rotation path of the outer end (the tip) of the guide to the rotation path of the transverse cutting edge. Similarly, in the case of a radial cutting edge the maximum transverse depth of cut is determined by the difference between displacement of the plane of rotation of the outer portion of the guide and the plane of rotation of the radial cutting edge from the centre of the central hub.

Such cutters have been used in the past for carving and shaping wood, metal, plastics materials and the like and a form of one such cutter is disclosed in U.S. Pat. No. 4,850,407.

It is an object of this invention to provide a rotary cutter in which the depth of cut and cutting characteristics can be varied depending upon the requirements of its intended use.

In one form the invention resides in a rotary cutter, or carver, comprising a central member adapted to be mounted to a shaft for rotation therewith and supporting a plurality of teeth located at intervals around a circular path, each tooth having at least one cutting edge, a second member adapted to be mounted in association with the central member for rotation therewith and being capable of selective angular displacement, in relation to central member, said second member supporting a set of guides located at intervals around a circular path such that each guide is associated with one tooth of the plurality of teeth and is located ahead of said tooth.

According to a preferred feature of the invention the cutting edge is a transverse cutting edge and the radius of the rotation path of the guides is at most equal to the radius of the rotational path of the cutting edge.

According to a further preferred feature of the invention the cutting edge is a radial cutting edge and the degree of axial displacement of the plane of the rotation path of the outer edge of the guide with respect to the centre of the first member is at most equal to the degree of axial displacement of the plane of the rotational path of the radial cutting edge, to vary the depth of the transverse cut.

According to a further preferred feature of the invention the second member is displaceable axially with respect to the teeth to vary the spacing between the plane of the rotation path of the guide and the plane of the rotation path of the cutting edge to vary the transverse cut depth.

According to a preferred feature of the invention the spatial relationship between each guide and its respective tooth is substantially constant.

In another form the invention resides in a rotary cutter comprising a central member adapted to be mounted to a shaft for rotation therewith and supporting a plurality of teeth located at intervals around a circular path, each tooth having at least one cutting edge, a second member adapted to be mounted in association with the first member for rotation therewith and being capable of selective angular displacement in relation to the central member, said second member supporting a set of guides located at intervals around a circular path such that each guide is associated with one tooth of said plurality of teeth located ahead of said teeth, wherein the cutting edge is both a transverse edge and a radial cutting edge wherein the radial edges on adjacent teeth are disposed to opposite sides of the cutter and wherein at least one of the teeth having a radial cutting edge to one side is associated with a first of said guides and at least one of the teeth having a radial cutting edge on the other side is associated with a second of said guides.

In the design of previous rotary cutters it appears to have been assumed that since the cutters are rotating at a high speed the rotation path of the cutting edges and the rotation path of the guide must be considered as two solid discs and that the depth of cut of a transverse cut is achieved only by there being a difference between the radii of the two rotation paths where the rotation path of the cutting edge has the greater radius.

As a result of observation, however, it seems that while the depth of cut of a radial cut can be determined by having differing radii of rotation paths of the cutting edges and the guides such is not the only determining factor. For instance it has been determined that the depth of cut of a transverse cutting edge is also controlled by the angular spacing of the guide with respect to the tooth immediately following the guide.

The invention will be more fully understood in the light of the following description of several specific embodiments. The description is made with reference to the accompanying drawings of which;

Figure 1:
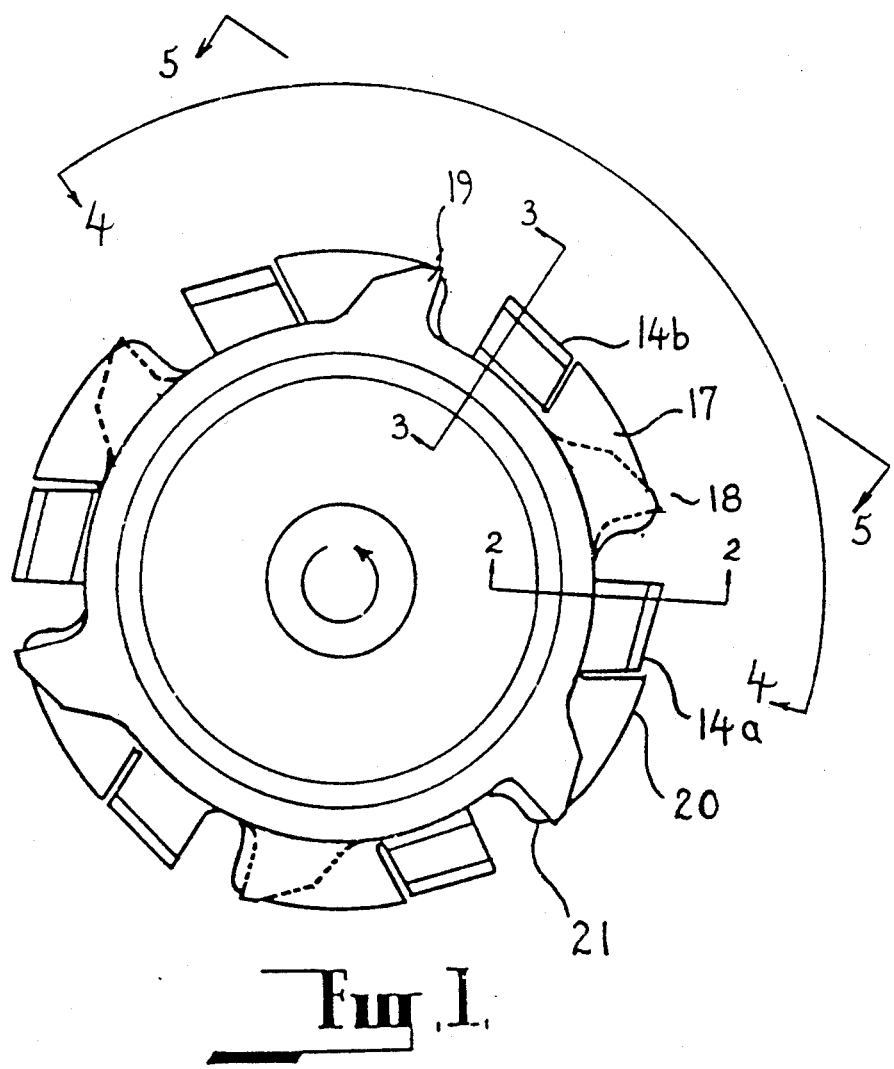
FIG. 1 is a side elevation of a first embodiment.
Figure 2:
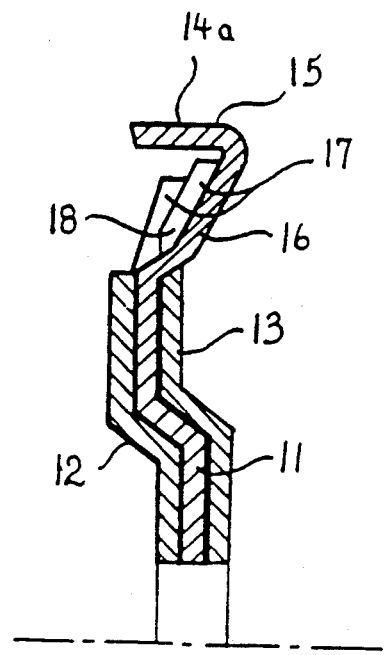
FIG. 2 is a cross-sectional view along line 2—2 of FIG. 1.
Figure 3:
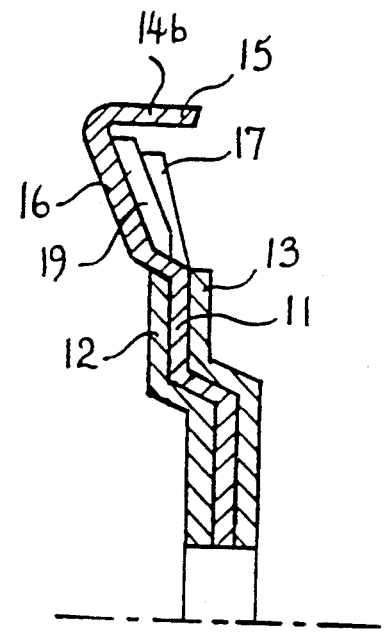
FIG. 3 is a view along line 3—3 of FIG. 1.
Figure 4:
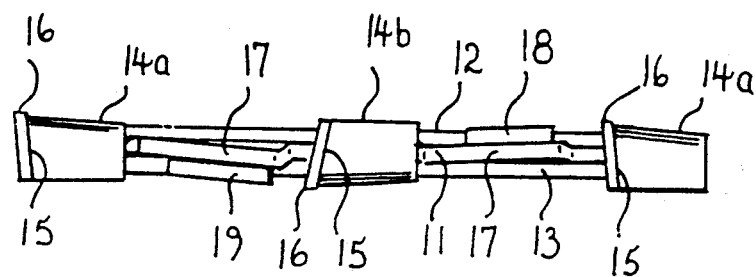
FIG. 4 is an angular plan view of a set of teeth of the cutter of FIG. 1 along line 4—4.
Figure 5:
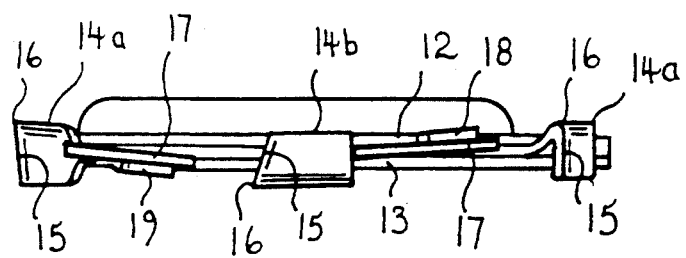
FIG. 5 is a perpendicular plan view of the cutter of FIG. 1 along lines 5—5.

The first embodiment comprises a rotary cutter having a first member in the form of a disc 11 which has a central aperture adapted to be receivable on the drive shaft of a suitable implement such as a portable angle grinder. The periphery of the disc is provided with two sets of teeth 14a abd 14b where each set comprises the same number of teeth and the teeth of each set are alternately disposed with the teeth of the other set. Each tooth 14 is formed to have a transverse cutting edge 15 and a radial cutting edge 16 whereby the radial cutting edges of one set of teeth 14a are at the opposite side of the disc 11 from the radial cutting edges of the other set of teeth 14b. The portion of each tooth rearward of the cutting edges is relieved rearwardly of the transverse and radial cutting edges, to be clear of the cutting edge path according to conventional practice.

While each tooth may be formed as shown in the drawings as being an integral part of the disc, which is formed from pressed metal, the teeth may alternatively be formed as separate elements fixed to the outer circumference of the disc, or fixed to radially extending protrusions provided on the disc, or fixed in front of and to the leading edge of the tooth where the cutting element is formed of a different material, from that of the disc, such as tungsten carbide or some other suitable specialised material according to conventional practice. In each case the cutting edges are raised marginally from the tooth body to provide rearward relief in order that the cutting edge only engages the work and to facilitate sharpening.

Each tooth is associated with a trailing portion 17 which is provided on the outer periphery of the disc rearward of the tooth and is separate from the tooth. The trailing portion 17 has a leading end 20 which is closely adjacent the trailing end of the tooth and has a trailing end 21 spaced from the cutting edges of the following tooth. In addition each trailing portion is "set" on an angle with respect to the plane of rotation path of the disc such that its trailing end is inclined outwardly and rearwardly from the plane in the direction of the offset of the radial cutting edge of the following tooth, providing thereby the means to move the guide axially. If desired the trailing portion can be formed with holes or dimple like depressions to further control the guide.

The disc 11 is associated with a pair of guide discs 12 and 13 which are located to each side of the disc in close face to face relationship therewith. Each guide disc is provided with a set of guides 18 and 19 which are provided on the periphery of each guide disc and are spaced angularly equidistant from each other. The guides of each disc are spaced between a pair of teeth 14a and 14b on the disc 11 whereby the guides 18 of one disc 13 are associated with one set of teeth 14a and a set of guides 19 on the other guide disc 12 are associated with the other set of teeth 14b such that each guide is ahead of its respective tooth. The outer radius of the rotation paths of the guides are a little less than the radius of the rotation path of the transverse cutting edges.

The guide discs are jointly angularly displaceable with respect to the first disc 11 such that the spacing between the guides 18 and 19 and the respective teeth can be set jointly to be substantially equal.

Any suitable means may be utilised to hold the guide means and central disc 11 in a fixed relationship when in use. Such means may comprise a nut receivable on the shaft to which the discs are mounted which is adapted to clamp the discs against a hub provided to the other side of the set of discs. Alternatively, and/or additionally any suitable locking means may be provided between the discs to directly fix them together.

By changing the angular displacement or orientation of the guide discs 12 and 13 relative to the central disc 11 the "set" which is applied by the trailing portion 17 which is inclined as described above, and against which the guides 18 and 19 abut, facilitates a variation in the axial displacement of the guides to vary the spacing between the rotation plane of the outer axial face of the guides 18 and 19 and the rotation plane of the respective radial cutting edge. The trailing portions 17 are set at an angle with respect to the plane of rotation path of the central member and provide a cam surface engageable with the guides. Hence, as the guide discs 12 and 13 are angularly displaced with respect to the central disc 11, the guides are axially displaced with respect to the plane of rotation of the central member. Hence, the spacing between the rotation plane of the outer axial face of the guides and the rotation plane of the respective radial cutting edges can be varied. As a result the depth of transverse cut which can be achieved by the cutter is capable of being varied.

In addition with the angular displacement of the guide discs 12 and 13 relative to the central disc 11 the spacing between each guide 18 and 19 and its respective tooth 14a and 14b is varied. This variation in spacing varies the depth of radial cut available to the cutter.

If desired the two guide discs 12 and 13 of the first embodiment may be incorporated into a single disc.

In addition the guide discs of the first embodiment may be moved and adjusted independently of each other to provide a further variation by enabling a variation in the depth of cut of one set of teeth with respect to the other.

In addition the guides 18 and 19 of the first embodiment may be sufficiently axially flexible and resilient to accommodate the "set" of the trailing portion 17 without effecting significant axial displacement of the discs on relative angular displacement of the guide discs.

In addition the discs 12 and 13 of the first embodiment which accommodate the guides may be located on the same side as the central disc, with the respective guides 18 and 19 inclined in an axial direction as required to align the tops of the guides with the radial cutting edge of the following tooth.

According to a second embodiment of the invention a cutter (not shown) of similar form to that of the previous embodiment is provided except that the trailing portions 17 are not present, or if present are coplanar with the body of the central disc 11. As a result the lateral spacing between the rotation planes of the guides and the radial cutting faces is not varied. It has been found however, that the depth of transverse cut achievable by such a cutter can be varied to some extent by varying the angular spacing between the guides and the respective radial cutting edges.

The radius of the rotation path of the guide may in each of the embodiments described above be the same as that for the transverse cutting edges. In such a case when the guide is closely adjacent the respective transverse cutting edges there will be little or no radial cut achievable by the cutter and as a result the cutter may be rendered to be one which is capable of transverse cut only. On the spacing between the guides and teeth being increased so too does the depth of the radial cut.

According to a further embodiment which is a variation of the second embodiment opposed camming surfaces may be provided in the space between the central disc and each of the guide discs to effect selective displacement therebetween.

Furthermore there need not be a one to one correspondence between the teeth and guides.

As a result of the invention a cutter is provided in which the cutting characteristics of a single cutter can be varied to vary the type of cut and the depth of cut. Where the cutter is used to produce both transverse and radial cuts the relative depth of said cut can be varied dependently or independently of each other.

The guides are located within the rotation path of the teeth, and as only the tip of the guide contacts the work the guides are thereby protected by the teeth from inadvertent displacement during use.

A substantial advantage of the invention as contained in the embodiment over prior art cutters, resides in that certain conventional cutters cannot be used safely and with certain materials if the cut is too deep, and accordingly, such cutters have fixed guides, which are set to effect one depth of cut whereby the cutter cannot cut and perform to its maximum potential, either deeper or finer. The present invention provides a cutter which can have a cut so fine that it is capable of fine finishing of surfaces safely or repairing damaged surfaces and yet is capable of being adjusted to enable the removal of waste rapidly by being changed to cut deeper, and to facilitate fractional variations between fine and deep cuts.

It should be appreciated that the scope of the present invention need not be limited to the particular scope of the embodiments described above or to the particular form of rotary cutter.

I claim:

1. A rotary cutter comprising a central member for mounting to a shaft for rotation therewith and supporting a plurality of teeth located at intervals around a circular path, each tooth having at least one cutting edge, a second member mounted coaxially with the central member for rotation therewith and in a selected one of a plurality of angular orientations relative to the central member, said second member supporting a plurality of guides located at intervals around a circular path such that each guide is located ahead of and spaced from one tooth of the plurality of teeth whereby, in use, the depth of cut of said at least one cutting edge can be varied by adjusting the angular orientation of the second member relative to the central member and hence changing the spacing between each guide and its corresponding tooth.

2. A rotary cutter as in claim 1 wherein the at least one cutting edge is a transverse cutting edge extending in a direction transverse to the plane of rotation of the central member, and the outer radius of the rotation path of the guides is at most equal to the radius of the rotation path of the transverse cutting edge.

3. A rotary cutter as in claim 1 wherein the cutting edge is a radial cutting edge extending in a direction substantially radial to the axis of rotation of the central member, and wherein the axial spacing of a plane of rotation of an outer axial face of the guides with respect to a plane of rotation of the central member is at most equal to the axial spacing of the plane of rotation of the member and a plane through the cutting edge.

4. A rotary cutter as in claim 2 wherein the cutting edge is a radial cutting edge extending in a direction substantially radial to the axis of rotation of the central member, and wherein the axial spacing of a plane of rotation of an outer axial face of the guides with respect to a plane of rotation of the central member is at most equal to the axial spacing of the plane of rotation of the member and a plane through the cutting edge.

5. A rotary cutter as in claim 3 wherein the guides are selectively displaceable axially with respect to the teeth to vary the spacing between the plane of rotation of the outer axial face of the guides and the plane of rotation of the radial cutting edge.

6. A rotary cutter as in claim 4 wherein the guides are selectively displaceable axially with respect to the teeth to vary the spacing between the plane of the rotation path of the guides and the plane of the rotation path of the radial cutting edge.

7. A rotary cutter as in claim 1 wherein said second member is one of a pair of second members adapted to be mounted coaxially with the central member on respective sides of the central member.

8. A rotary cutter comprising a central member adapted to be mounted to a shaft for rotation therewith and supporting a plurality of teeth located at intervals around a circular path, each tooth having a transverse cutting edge extending in a direction transverse to the plane of rotation of the central member and a radial cutting edge extending in a direction substantially radial to the axis of rotation of the central member, a second member mounted coaxially with the central member for rotation therewith and in a selected one of a plurality of angular orientations relative to the central member, said second member supporting a plurality of guides located at intervals around a circular path such that each guide is located ahead of and spaced from one tooth of said plurality of teeth, the radial cutting edge on adjacent teeth being disposed to lie on opposite sides of the cutter and wherein at least some of the teeth having a radial cutting edge to one side of the cutter are followed by a first group of said plurality of guides and at least some of the teeth having a radial cutting edge on the other side of the cutter are followed by a second group of said plurality of guides whereby, in use, the depth of cut of at least said transverse cutting edge can be varied by adjusting the angular orientation of the second member relative to the central member and hence changing the spacing between each guide and its corresponding tooth.

9. A rotary cutter as in claim 8 wherein said second member is one of a pair of second members and the first group of said guides are supported on one second member mounted to lie on one side of said central member and the second group of said guides are supported on the other second member mounted to lie on the other side of the central member.

10. A rotary cutter as in claim 9 including means for changing the angular orientation of the second members relative to the central member.

11. A rotary cutter as in claim 10 including support means for axially displacing the guides relative to the plane of rotation of the central member.

12. A rotary cutter as in claim 11 wherein said support means comprises a cam surface engageable with the second members and angularly displaceable relative to the second members.

13. A rotary cutter as in claim 12 wherein the cam surface comprises a plurality of radial extensions provided on the central member rearward of at least some of said teeth and engageable with said guides, each radial extension being inclined with respect to the plane of rotation of said central member, in the direction of the radial cutting edge of the following tooth.

14. A rotary cutter as in claim 10 wherein the outer radius of the rotation paths of the guides is at most equal to the radius of the rotation paths of the transverse cutting edge.

15. A rotary cutter as in claim 11 wherein the axial spacing of the plane of the rotation path of the outer axial faces of the guides with respect to the plane of rotation of the central member is at most equal to the axial spacing of the plane of the rotation of the member and a plane through the radial cutting edge.

* * * * *